United States Patent
Li et al.

(10) Patent No.: US 8,382,624 B2
(45) Date of Patent: Feb. 26, 2013

(54) POWERTRAIN FOR HYBRID ELECTRICAL VEHICLE

(75) Inventors: Shufu Li, Hangzhou (CN); Jian Yang, Hangzhou (CN); Tong Zhang, Jinshan District (CN); Wei Yu, Jinshan District (CN); Zhitao Ma, Jinshan District (CN); Haisheng Yu, Jinshan District (CN)

(73) Assignees: Shanghai Maple Guorun Automobile Co (CN); Zhejiang Geely Holding Group Co (CN)

( * ) Notice: Subject to any disclaimer, the term of this patent is extended or adjusted under 35 U.S.C. 154(b) by 0 days.

(21) Appl. No.: 13/399,197

(22) Filed: Feb. 17, 2012

(65) Prior Publication Data

US 2012/0208664 A1 Aug. 16, 2012

(30) Foreign Application Priority Data

Aug. 24, 2009 (CN) .......................... 2009 1 0194470

(51) Int. Cl.
*F16H 3/72* (2006.01)
(52) U.S. Cl. ............................................ 475/5; 475/284
(58) Field of Classification Search .............. 475/5, 150, 475/284, 313, 325
See application file for complete search history.

(56) References Cited

U.S. PATENT DOCUMENTS

| | | | |
|---|---|---|---|
| 7,632,201 B2 * | 12/2009 | Takami et al. ..................... | 475/5 |
| 2004/0256165 A1 * | 12/2004 | Tomita et al. ................. | 180/65.2 |
| 2005/0233851 A1 * | 10/2005 | Minagawa et al. ............... | 475/5 |
| 2006/0175102 A1 * | 8/2006 | Imazu .......................... | 180/65.2 |
| 2007/0111852 A1 * | 5/2007 | Yatabe et al. ................. | 477/107 |

FOREIGN PATENT DOCUMENTS

| | | |
|---|---|---|
| CN | 101149094 | 3/2008 |
| CN | 101439669 | 5/2009 |
| CN | 101451596 | 6/2009 |
| CN | 201506247 U | 6/2010 |
| FR | 2918003 | 1/2009 |
| JP | 62283241 | 12/1987 |
| JP | 2004124977 | 4/2004 |

OTHER PUBLICATIONS

Search Report from related PCT patent application PCT/CN2010/001283.

* cited by examiner

*Primary Examiner* — David D Le
*Assistant Examiner* — Huan Le
(74) *Attorney, Agent, or Firm* — Anderson, Gorecki & Rouille, LLP

(57) ABSTRACT

The invention relates to a powertrain for a hybrid electrical vehicle, comprising an engine, a first motor, a second motor and a transmission device, said transmission device having a planet gear set with double planet gear ranks comprising a first planet gear rank and a second planet gear rank, said engine is arranged on one side of said planet gear set, said first motor and said second motor are arranged on the other side of the planet gear set, said first planet gear rank comprises a small sun gear, a planet carrier, a short planet gear and an outer ring gear, said second planet gear rank comprises a big sun gear, a long planet gear and the planet carrier shared with the first planet gear rank, said long planet gear meshes with the short planet gear and the big sun gear respectively.

18 Claims, 2 Drawing Sheets

POWERTRAIN FOR HYBRID ELECTRICAL VEHICLE

TECHNICAL FIELD

The invention relates to a powertrain for a hybrid electrical vehicle, in particular, to a powertrain used for a hybrid electrical vehicle and using a planet gear set with double planet gear ranks to couple power sources.

BACKGROUND

Due to short of energy, enhancement of the public environmental awareness, and increasingly strict regulations of the government, environment friendly electrical vehicle and fuel cell vehicle emerge. However, due to various constraints on the technology, vehicles of such types are difficult to be comprehensively popularized in a short time. Therefore, a hybrid electrical vehicle which has been relatively mature in technology is a comparatively desired choice at present.

As a new type of energy saving, environment friendly vehicles, hybrid electrical vehicles (HEV) are in a booming phase in terms of technology and market. The biggest difference of hybrid electrical vehicles from conventional internal combustion engine vehicles and pure electric vehicles is the powertrain.

In parallel configuration and hybrid configuration of HEV, power coupling systems combine multiple powers of the HEV together, realizing a reasonable power distribution among the multiple power sources and transmitting the powers to the drive axles. Thus, power coupling systems play an important role in the development of HEV, their performances being directly related to whether the HEV overall performances reach design requirements or not, and are the most key part of HEV.

Planet gear sets are characterized with multiple freedoms and flexible controllability of input/output, and are of a compact structure, a small volume and a big range of speed ratios, thus are employed in more and more power coupling systems of hybrid electrical vehicles, this is also a development tendency of power assemblies of hybrid electrical vehicles nowadays.

Toyota proposed the first hybrid electrical vehicle Prius in 1997, and further proposed Prius 2006 carrying the most new $3^{rd}$ generation of electromechanical hybrid powertrain, still utilizing the hybrid powertrain THS of a hybrid configuration, wherein a planet gear system redistribute the output power from the engine, realizing a purpose of reasonably balancing the loads of engine.

FIG. 1 shows a structure principle diagram of the powertrain for the Toyota Prius hybrid electrical car. The powertrain thereof comprises an engine E, a motor MG1, a motor MG2 and a power coupling system comprising a planet gear set of one single planet gear rank, and etc. In this powertrain, engine E connects to a planet carrier a of the planet gear set of one single planet gear rank through a shock absorbing damper, and transmits the power to an outer ring gear c and a sun gear d via a planet gear b. the outer ring gear c is connected to a output shaft, the output shaft connects to the rotor of the motor MG2 through a reducing gear set e. The sun gear d connects to the rotor of the motor MG1. The output shaft transmits the power to the wheels through a chain drive system f, a main reducer g and a differential h. The system transmits most of the torque of the engine E directly to the output shaft, and transmits a small part of the torque to the motor MG1 for electricity generation, the electricity energy generated by the motor MG1 is used for battery charging, or driving the motor MG2 to increase the drive force according to instructions. This structure may enable the engine in an efficient region or a low emission region all the time by adjusting the torque and the rotational speed of the motor MG1. Furthermore, through adjusting the rotational speeds of various elements of the planet gear set, it can work in a similar manner to a continuously variable transmission.

However, as the two motors MG1, MG2 of the above said powertrain are arranged on both sides of the planet gear set of one single planet gear rank, and share a set of cooling system, the arrangement of the motor cooling system is complex, the integrated level of the motor system is low, and the drive shafts on the both sides of the planet gear set are not equal in length, not facilitating the arrangement of a nose cabin. Moreover, motor MG1 and engine E are parallel arranged on the same side of the planet gear set, as the distance therebetween is short, and the optimal operation temperature of the motor MG1 is 60 centigrade degree, but the optimal operation temperature of the engine E is 90 centigrade degree, motor MG1 may heat quickly under the influence of the heat dissipation from the engine E, making the corresponding motor cooling system often be in a high load operation condition, in turn affecting the efficiency of the overall vehicle.

As abovementioned powertrains employ a planet gear set of one single planet gear rank, its reduction ratio range is small, and thus a wide variation range of the rotational speed of the motor is required, high requiring the torque of the motor. Therefore, the requirements on the manufacture accuracy, rotational speed/torque characteristics and dynamic balance of the motor are very harsh. In order to achieve adequate reduction ratio, the reduction device for the output shaft employ multi-stage drive components including the chain drive system f, the main reducer g, further increasing the complexity of the system, and enhancing the requirements of the system on the space arrangement.

China patent document CN 101149094A discloses a hybrid drive device based on a planet gear system of two planet gear ranks, comprising an internal combustion engine, a motor, and an power output and front and rear planet gear ranks. Wherein the planet carrier of the front planet gear set is connected to the ring gear of the rear planet gear set, the sun gears of both front and rear planet gear set are commonly connected to the motor shaft, the engine is selectively connected to the ring gear or planet carrier of the front planet gear set through a clutch, the planet carrier of the rear planet gear set is connected to the output. As its front and rear planet gear set are parallel arranged, it has relatively large shape dimensions, and the structure is not compact enough; for only two input shaft and one motor exist, requirements on the controlling of the motor are high.

Therefore, in the art, there exists a need for improving the powertrain of hybrid electrical vehicles, in particular the power sources coupling structure or drive device thereof.

SUMMARY OF THE INVENTION

The invention provides a powertrain for a hybrid electrical vehicle, which can overcome at least one or more of disadvantages of small reduction speed ratio range of the planet gear set, incompact structure, high requirements on the motor performance, low integrated level of the motor and complex cooling system or the like, which exist in the prior art hybrid powertrains, and correspondingly has at least one or more of advantages of compact structure, high drive efficiency, large reduction speed ratio range, low requirements on performances such as the torque of the motor, and simple and easy controllability of cooling system thereof and etc.

In order to achieve abovementioned objects, the invention employs the following solutions.

A powertrain for a hybrid electrical vehicle, comprising an engine, a first motor, a second motor and a transmission device, said transmission device is provided with a planet gear set with double planet gear ranks comprising a first planet gear rank and a second planet gear rank, said engine is arranged on one side of the planet gear set, said first motor and second motor are arranged on the other side of the planet gear set, said first planet gear rank comprises a small sun gear, a planet carrier, a short planet gear and an outer ring gear, said second planet gear rank comprises a big sun gear, a long planet gear and said planet carrier 7 shared with said first planet gear rank, said long planet gear meshes with the short planet gear and the big sun gear respectively, the spindle of said big sun gear is rotatably sleeved on the spindle of the small sun gear, a crankshaft of the engine is connected to the planet carrier, the outer ring gear outputs power, the spindle of the small sun gear is connected with the rotor of the first motor, an extension of the spindle of the small sun gear is connected to one side of a second lock-up clutch to selectively lock the spindle of the small sun gear, the spindle of the big sun gear is connected with a rotor of the second motor, said planet carrier is connected to one side of a first lock-up clutch to selectively lock the planet carrier.

The first motor in the invention is mainly used for an electricity generation purpose, while the second motor is mainly used for driving, the employed planet gear set with double planet gear ranks evolves from a Ravigneaux gear shifting mechanism. As a four-shaft system having three input shafts and one output shaft, it thus has more control modes than a common three-shaft drive system of one single planet gear rank, facilitating making the engine be in its optimal operation condition of high efficiency or low emission by controlling the torques of the first motor and the second motor, increasing the drive efficiency of the system, lowering the emission, saving energy. Compared with the present Ravigneaux gear shifting mechanism, the invention reduces the drive ratio of the planet geartrain connecting to the second motor, thereby may reduce the requirements on the rotational speed and torque of the second motor, such that the manufacture difficulty and the cost of the second motor are effectively lowered. Moreover, as the reduction ratio of the system is increased by using a drive mechanism with double planet gear ranks, the structure of the main reducer is simplified, and the two planet gear ranks are integrated together, largely simplifying the structure, observably reducing shape dimensions thereof, and facilitating a space arrangement.

As the invention adopts an improved Ravigneaux gear shifting mechanism, the first motor and the second motor connected to the small sun gear and the sun gear respectively may be arranged a side of the planet gear set with double planet gear ranks apart from the engine crankshaft, thereby avoiding the influence of the heat dissipation of the engine on the first motor and the second motor; facilitating the integration of the first motor and the second motor, effectively simplifying the structure and controlling of the motor cooling system, and increasing the efficiency of the drive device, meanwhile enabling the drive shaft lengths on both sides of the planet gear set to approach to each other in favor of the arrangement of the nose cabin.

Preferably, said first motor and second motor are integrated together. Said first motor and second motor are integrated together, not only simplifying the structure of the cooling system thereof, but also facilitating the control on the cooling system, meanwhile facilitating the increase of the reliability and stability of the first motor and the second motor.

Preferably, the number of said short planet gears and long planet gears is 3 or 4, and these planet gears are circumferentially arranged at even intervals, thereby facilitating the uniform loading of the overall planet gear rank.

Preferably, said outer ring gear is connected to the main reducer acting as a drive mechanism of the gear set to output power, thereby making the structure of the whole drive device more compact.

Preferably, the other side of said first lock-up clutch is connected to a housing enclosing said planet gear set, the first motor and the second motor, the other side of the second lock-up clutch is connected to said housing.

Preferably, when said hybrid electrical vehicle starts, the first lock-up clutch is engaged to lock said planet carrier and in turn lock the crankshaft of the engine, and the second motor is in drive condition to start the vehicle.

Preferably, when said hybrid electrical vehicle is in a pure electric drive mode, said first lock-up clutch is engaged to lock the engine, said second motor operates as a power source to propel said hybrid electrical vehicle.

Preferably, when said hybrid electrical vehicle is in a hybrid drive mode, said engine, first motor and second motor cooperate to output power while the engine is in a desired operation region, wherein the first motor is used for electricity generation or locked as needed, the second motor is used to provide assistant power.

Preferably, when said hybrid electrical vehicle is in a parking and charging mode, the outer ring gear is locked, the engine drives the first motor and/or second motor to charge the battery.

Preferably, when said hybrid electrical vehicle is in a regenerative braking mode, the engine is locked, the outer ring gear acting as a power input drives the first motor and the second motor to generate electricity.

Therefore, the invention may have the following beneficial effects: (1) employing an improved Ravigneaux planet gear drive mechanism so as to lower the requirements of the system on the design and manufacture of the second motor; (2) increasing the drive efficiency and lowering the emission by controlling the two motors to make the engine operates in the optimal operation region all the time; (3) locking the first motor by a clutch, thereby avoiding the first motor operating near zero-rotational speed and increasing the efficiency of the system; (4) in the pure electric drive mode, locking the engine by a lock-up clutch may avoid the engine rotating in a counter direction and simplify the control of the system; (5) two motors are arranged on a side of the planet gear rank apart from the engine and integrated together, avoiding the influence of the heat dissipation of the engine on the motors, simplifying the structure and control of the motor cooling system, and increasing the system efficiency.

BRIEF DESCRIPTION OF DRAWINGS

Other desired features and characteristics of the invention will become apparent taking into account the accompanying figures and referring to the following detailed description, wherein.

EMBODIMENTS

The following detailed description is merely exemplary in nature and not intended to limit the application or use. Moreover, the invention is not intended to be constrained by any theories stated or suggested in previous Technical Field, Background, and Summary of the invention or the following descriptions.

Figure 1:
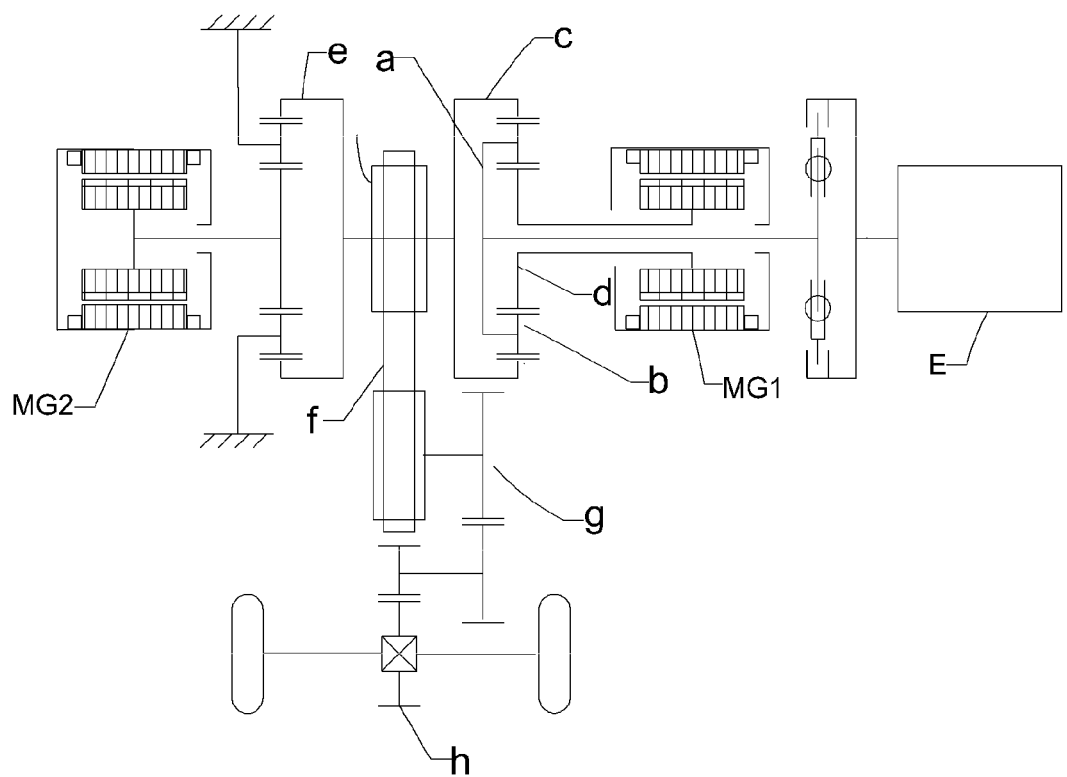
FIG. 1 is a structure principle diagram of the Toyota Prius hybrid powertrain.
Figure 2:
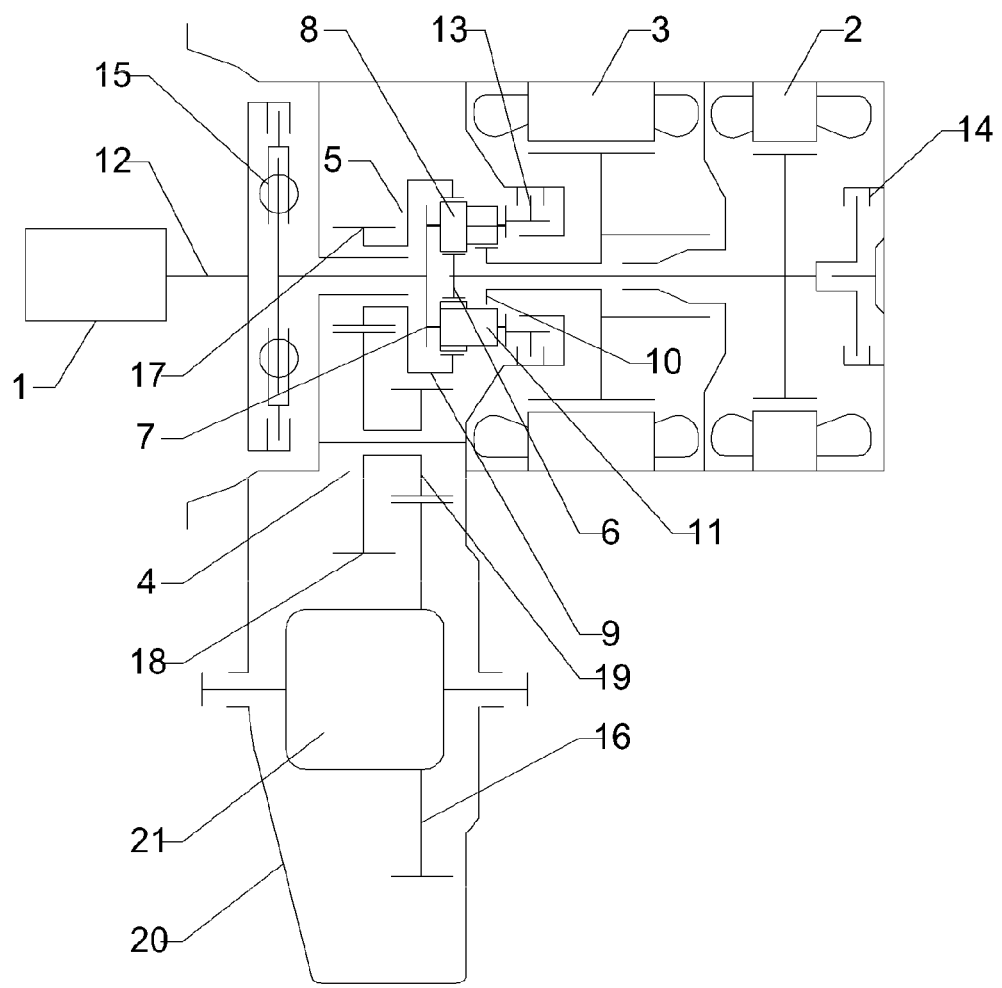
FIG. 2 is a structure principle diagram of the powertrain for a hybrid electrical vehicle in accordance with the invention.

FIG. 2 shows a four-shaft hybrid power device with double planet gear ranks in according with a preferable embodiment of the invention. In the embodiment shown in FIG. 2, the hybrid powertrain of the invention mainly includes an engine 1, a first motor 2 and a second motor 3, and a planet gear set 5 with double planet gear ranks coupling these power sources together. A housing 20 may enclose the planet gear set 5, the first motor 2 and second motor 3 and other related components.

In the embodiment of FIG. 2, the engine 1 is located at the left side of the planet gear set 5, and the first motor 2 and second motor 3 are located at the right side of the planet gear set 5. Of course, according to particular application needs, such arrangement is variable, for example the engine 1 is located at the right side of the planet gear set 5, and the first motor 2 and second motor 3 are located at the left side of the planet gear set 5.

The planet gear set 5 with double planet gear ranks may evolve from a Ravigneaux planet gear mechanism, and comprises a first planet gear rank and a second planet gear rank. The first planet gear rank comprises a small sun gear 6, a planet carrier 7, a short planet gear 8 arranged on the planet carrier 7 and an outer ring gear 9. The short planet gear 8 meshes with the small sun gear 6 and the outer ring gear 9 respectively. For force balance, the number of the short planet gears 8 can be 3 or 4, and these short planet gears 8 are circumferentially arranged at even intervals. In other embodiments, however, a different number and arrangement of the short planet gears 8 can be set as needed. The crankshaft 12 of the engine is connected to the planet carrier 7 through one shock absorbing damper 15 and a related shaft, the outer ring gear 9 can be connected to the gear 16 of the differential through a main reducer 4 consisting of a gear set.

The main reducer 4 comprising a main reducing gear 17 arranged between the outer ring gear 9 and a shock absorbing damper 15 and connected to the outer ring gear 9, a main reduction input gear 18 arranged beside the main reducing gear 17 and meshing therewith, and a main reduction output gear 19 coaxially connected to the main reduction input gear 18. The main reduction output gear 19 meshes with the differential gear 16 to output power. The spindle of the small sun gear of the first planet gear rank is connected to the rotor of the first motor arranged on the right side of the double planet gear ranks 5, the extension of the spindle is connected to a side of the second lock-up clutch 14, and the other side of the second lock-up clutch 14 is connected to the housing 20. The second lock-up clutch 14 can be selectively engaged to securely connect the small sun gear to the housing 20.

The second planet gear rank of the planet gear set 5 comprises a big sun gear 10 rotatably sleeved on the spindle of the small sun gear 6 and a long planet gear 11 also arranged on the planet carrier 7 of the first planet gear rank. The long planet gear 11 meshes with the short planet gear 8 as well as the big sun gear 10, but does not mesh with the outer ring gear 9. As with the short planet gear 8, the long planet gear 11 can also be circumferentially arranged at even intervals in a number of 3 or 4. In other embodiments, however, a different number and arrangement of the long planet gear 11 can be set as needed. The spindle of the big sun gear 10 is connected to the rotor of the second motor 3 arranged between the first motor 2 and the planet gear set 5. The short planet gear spindle on the planet carrier 7 for mounting the short planet gear 8 is connected at its right side extending end with a side of the first lock-up clutch 13, the other side of the first lock-up clutch 13 is fixed onto the housing 20, when the first lock-up clutch 13 is selectively engaged to lock the planet carrier 7, the engine 1 connected therewith is locked. Of course, this powertrain can include other components, for example a lock-up clutch for locking the outer ring gear 9 and so on, but the details will not be provided herein.

The first motor 2 and second motor 3 both arranged on the right side of the planet gear set 5 can substantially be integrated together, and share one set of cooling system, facilitating not only the manufacture thereof but also the control of the cooling system. Compared with other arrangements, the structure of the cooling system is simplified, and will not be affected by the engine with a high temperature, increasing the efficiency.

Due to the planet gear set with double planet gear ranks adopted in the transmission device of the inventive power source, a continuously variable shifting can be realized. The torques input by these three power sources of the engine 1, the second motor 3 and the first motor 2 are transmitted to the output after coupled by the inventive transmission device, and in turn transmitted to the differential 21 through the main reducer 4, ultimately to the wheels. Therefore, in practical use, different combinations of operation mode and condition of the three inputs connected to the three power sources can generate various output modes. The following descriptions are directed to the typical operations and corresponding power transmission routines of the power sources or inputs when the vehicle is in four typical modes of starting, driving, reversing and parking.

Starting Condition

At starting, electric start is mainly used. To prevent the engine 1 form rotating reversely, the first lock-up clutch 13 is used to lock the engine 1. The second motor 3 is in a driving mode, and its torque is transmitted to the wheels through the big sun gear 10, the long planet gear 11, the short planet gear 8, the outer ring gear 9, the main reducer 4, and the differential 21, thereby driving the vehicle to start. Meanwhile the short planet gear 8 drives the small sun gear 6 to idle. Furthermore, when the battery is short of electric charges, an electromechanical hybrid mode can be adopted, using the second lock-up clutch 14 to lock the first motor 2 and releasing the first lock-up clutch 13. At this moment, the torque of the second motor 3 is transmitted to the wheels through the big sun gear 10, the long planet gear 11, the short planet gear 8, the outer ring gear 9, the main reducer 4, and the differential 21 to drive the vehicle to start. At the same time the short planet gear 8 drives the planet carrier 7 to rotate, and to start the engine 1 through the shock absorbing damper 17, such that the battery is charged by the engine 1.

Driving Condition

If a pure electric driving mode is adopted, wherein the engine 1 is locked by the first lock-up clutch 13, the torque and rotational speed of the output can be changed by changing the torque and rotational speed of the second motor 3, so as to control the acceleration and speed of the vehicle. When the inventive powertrain is in a pure electric driving mode, the first lock-up clutch 13 arranged on the planet carrier 7 locks the planet carrier 7 as well as the engine crankshaft 12 connected therewith, so as to avoid the engine crankshaft rotating reversely, and lower the complexity of the system control in pure electric driving.

If an electromechanical hybrid mode is adopted, wherein the engine 1 is started, the second lock-up clutch 14 can be released and the first motor 2 is switched into an electricity generating condition. By adjusting the torques of the first motor 2 and the second motor 3, the output is accelerated, and a part of the torque of the engine 1 is transmitted to the first motor 2 through the small sun gear 6 for electricity generation, so as to charge the battery, such that the engine 1 can stay in a desired operation region, increasing the fuel efficiency. When the vehicle runs at a high speed in an electromechanical hybrid mode, the first motor 2 can be locked using the second lock-up clutch 14, so as to ensure that the total torque of the engine is transmitted to the output, for increasing the transmission efficiency, the second motor 3 at this moment can act as an assistant power, in order to ensure that the engine 1 stays in an optimal operation condition all the time to save energy.

When the vehicle runs at a high speed, the rotational speed of the first motor 2 needs to be controlled around zero rotational speed so as to adjust the power output of the engine, the efficiency of the first motor 2 is thus very low, and the output power of the system and power needs always fluctuate, and there exists some hysteresis. These all increase the control difficulty, the invention avoids the first motor 2 operating around zero rotational speed through locking the first motor 2 by the second lock-up clutch 14 arranged on the spindle of the first motor 2, observably increasing the transmission efficiency of the overall vehicle.

Reversing Condition

The vehicle is reversed by locking the engine 1 using the first lock-up clutch 13 and changing the rotation direction of the second motor 3, so as to conveniently control the second motor 3 to achieve reverse operation.

Parking and Charging Condition

When the vehicle is in parking condition, a parking lock device of the vehicle locks the output of the powertrain, hence, the outer ring gear 9 at this moment in a locked state. In the case that the battery needs charging, both first motor 2 and second motor 3 may be in electricity generation condition at the same time, the torque of the engine 1 is transmitted through the planet carrier 7 to the first motor 2 and second motor 3, respectively, for electricity generation to charge the battery.

Regenerative Braking Condition

When the vehicle is coasting down, the inertia torque of the vehicle is transmitted to the outer ring gear 9 through the differential 21 and main reducer 4, the outer ring gear 9 at this moment acts as a power input, which feeds the torque back to the first motor 2 and second motor 3 for electricity generation to charge the battery, so as to harvest energy and increase the vehicle fuel economics.

The above listed are only some operation ways of the commonly used operation modes of the invention. The invention employs a four-shaft transmission mechanism with double planet gear ranks in combination with two lock-up clutches, such that its multiple inputs and outputs may have multiple combinations of operation mode and condition under the same operation principle. Any operation mode and control manner based on the teaching of the invention will not depart from the spirit scope of the invention.

What is claimed is:

1. A powertrain for a hybrid electrical vehicle, comprising an engine, a first motor, a second motor and a transmission device, said transmission device is provided with a planet gear set with double planet gear ranks comprising a first planet gear rank and a second planet gear rank, said engine is arranged on one side of the planet gear set, said first motor and second motor are arranged on the other side of the planet gear set, said first planet gear rank comprises a small sun gear, a planet carrier, a short planet gear and an outer ring gear, said second planet gear rank comprises a big sun gear, a long planet gear and said planet carrier shared with said first planet gear rank, said long planet gear meshes with the short planet gear and the big sun gear respectively, a spindle of said big sun gear is rotatably sleeved on a spindle of the small sun gear, a crankshaft of the engine is connected to the planet carrier, the outer ring gear outputs power, the spindle of the small sun gear is connected with a rotor of the first motor, an extension of the spindle of the small sun gear is connected to one side of a second lock-up clutch to selectively lock the spindle of the small sun gear to a housing, the spindle of the big sun gear is connected with a rotor of the second motor, said planet carrier is connected to one side of a first lock-up clutch to selectively lock the planet carrier to the housing.

2. The powertrain of the claim 1, wherein the number of said short planet gears is 3 or 4 and the number of said long planet gears is 3 or 4, said short and long planet gears being circumferentially arranged at even intervals, respectivey.

3. The powertrain of the claim 1, wherein the outer ring gear is connected to a main reducer acting as a gear set transmission mechanism, so as to output power.

4. The powertrain of the claim 1, wherein the other side of the first lock-up clutch is connected to a housing enclosing said planet gear set, said first motor and said second motor, and the other side of said second lock-up clutch is connected to the housing.

5. The powertrain of the claim 1, wherein, when said hybrid electrical vehicle starts, the first lock-up clutch is engaged to lock said planet carrier and thereby lock the crankshaft of the engine, and said second motor is in driving condition to start the vehicle.

6. The powertrain of the claim 1, wherein, when said hybrid electrical vehicle is in a pure electric driving mode, said first lock-up clutch is engaged to lock the engine, and said second motor operates as a power source to drive the vehicle.

7. The powertrain of the claim 1, wherein, when said hybrid electrical vehicle is in a hybrid driving mode, said engine, said first motor and said second motor cooperate to output torque while the engine is in a desired operation region, wherein the first motor is used for electricity generation or is locked, and the second motor is used to provide assistant power.

8. The powertrain of claim 1, wherein, when said hybrid electrical vehicle is in a parking and charging condition, the outer ring gear is locked, and the engine drives the first motor and/or the second motor to charge a battery.

9. The powertrain of claim 1, wherein, when said hybrid electrical vehicle is in a regenerative braking condition, the engine is locked, and the outer ring gear acting as a power input so as to drive the first motor and the second motor to generate electricity.

10. The powertrain of the claim 1, wherein said first motor and second motor are integrated together.

11. The powertrain of the claim 10, wherein the number of said short planet gears is 3 or 4 and the number of said long planet gears is 3 or 4, said short and long planet gears being circumferentially arranged at even intervals, respectivey.

12. The powertrain of the claim 10, wherein the outer ring gear is connected to a main reducer acting as a gear set transmission mechanism, so as to output power.

13. The powertrain of the claim 10, wherein the other side of the first lock-up clutch is connected to a housing enclosing said planet gear set, said first motor and said second motor, and the other side of said second lock-up clutch is connected to the housing.

14. The powertrain of the claim 10, wherein, when said hybrid electrical vehicle starts, the first lock-up clutch is engaged to lock said planet carrier and thereby lock the crankshaft of the engine, and said second motor is in driving condition to start the vehicle.

15. The powertrain of the claim 10, wherein, when said hybrid electrical vehicle is in a pure electric driving mode, said first lock-up clutch is engaged to lock the engine, and said second motor operates as a power source to drive the vehicle.

16. The powertrain of the claim 10, wherein, when said hybrid electrical vehicle is in a hybrid driving mode, said engine, said first motor and said second motor cooperate to output torque while the engine is in a desired operation region, wherein the first motor is used for electricity generation or is locked, and the second motor is used to provide assistant power.

17. The powertrain of claim 10, wherein, when said hybrid electrical vehicle is in a parking and charging condition, the outer ring gear is locked, and the engine drives the first motor and/or the second motor to charge a battery.

18. The powertrain of claim 10, wherein, when said hybrid electrical vehicle is in a regenerative braking condition, the engine is locked, and the outer ring gear acting as a power input so as to drive the first motor and the second motor to generate electricity.

* * * * *